(No Model.)

E. J. FROST & W. C. SQUIRE.
APPARATUS FOR CARBURETING AIR OR GAS.

No. 485,185. Patented Nov. 1, 1892.

WITNESSES:
W. Barnet Le Van.
Chas. C. Collier.

INVENTORS:
Edward J. Frost
Willis C. Squire
BY
Chas. B. Collier,
ATTORNEY

UNITED STATES PATENT OFFICE.

EDWARD J. FROST AND WILLIS C. SQUIRE, OF PHILADELPHIA, PENNSYLVANIA.

APPARATUS FOR CARBURETING AIR OR GAS.

SPECIFICATION forming part of Letters Patent No. 485,185, dated November 1, 1892.

Application filed May 9, 1891. Serial No. 392,223. (No model.)

*To all whom it may concern:*

Be it known that we, EDWARD J. FROST and WILLIS C. SQUIRE, citizens of the United States, residing at the city of Philadelphia, in the State of Pennsylvania, have invented certain new and useful Improvements in Apparatus for Carbureting Air or Gas, of which the following is a full, clear, and accurate description, reference being had to the accompanying drawings, forming a part of this specification, in which—

Figure 1:
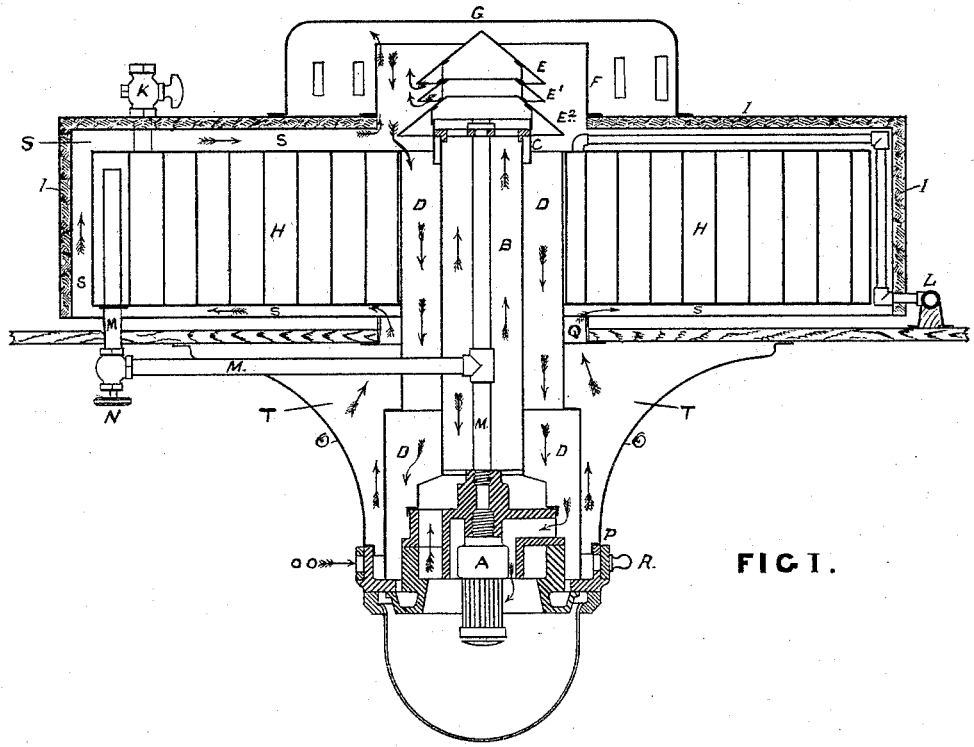
Figure 2:
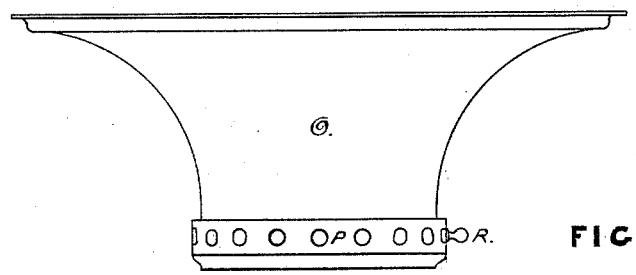

Figure 1 is a longitudinal section of the apparatus as applied to a railroad-car, and Fig. 2 a detail showing the casing surrounding the upper part of the lamp and the mechanism for regulating the supply of air to the chamber formed thereby.

Our invention is applicable especially to railroad-cars, street-cars, ferry-boats, and similar uses where it is required to use a carburetor placed on the outside of the apartment to be lighted, and hence exposed to variable temperatures; and its object is to secure a uniform condition of the burner while the chimney is exposed to a varying condition of drafts, and further to provide means for maintaining a proper temperature of the carburetor when the general temperature of the atmosphere is too low to admit of the proper vaporization of the carbureting material contained therein.

A in the drawings is a gas-burner such as commonly used in lamps of this construction.

B is the chimney for carrying off the products of combustion to the outside air.

C represents an extension of the chimney, and of larger diameter than the latter.

D is an air flue or shaft leading from above, where it is open to the external atmosphere. Its lower end forms an air-tight joint with the burner and delivers the air directly to the flame.

E E' E² are cone-deflectors attached to the chimney.

F is a collar surrounding the cone-deflectors.

G is a shield or cap surmounting all, and is open at the sides for the escape of the products of combustion.

H represents a carburetor, which we prefer to construct as described in the patent of said Edward J. Frost, No. 312,836, and dated February 24, 1885; but it may be of any ordinary form, and as such structures are well understood we do not deem it necessary to further describe its interior. It is shown as being supported on the roof of a car and is inclosed in a casing I, leaving an air-space S all around it.

K is the usual gasoline-charging cock.

L is a pipe for introducing air or gas to the carburetor.

M is a pipe leading from the carburetor to the burner, governed by a valve N. This pipe is led to the center of the chimney, passing vertically down to the burner through the hot products of combustion, heating the gas before it enters the burner.

O O is a casing surrounding the upper portion of the lamp inside the car, pierced at its lower end with an opening or openings $o\, o$ for the admission of air and preferably encircled by a governing-register P in the form of a ring, which is provided with an opening or openings corresponding to that or those of the casing and which opening or openings in the casing and register may be made to coincide, break connection, or arranged to cut off or regulate the supply of air admitted to the chamber T, surrounding the lamp, formed by the casing, by turning the registering-ring by the knob R. It will be noticed that there is a communication between the chamber T within the casing O and the air-space S of the casing I, surrounding the carburetor, by and through the opening Q in the roof of the car; but no air will pass from one to the other when the register P is closed. It will be observed, also, that the air for the support of combustion of the lamp-flame comes from above and entirely from outside of the car.

The operation of the apparatus, which is clearly defined by the arrows shown in the drawings, will now be described. The carburetor being charged and gas being duly evolved, the gas-valve N is opened and the lamp lighted. The products of combustion from the flame will ascend through the central chimney B and the extension C thereof and thence through the cone-deflectors, and are discharged into the atmosphere. The draft caused by this upward movement of the heated products causes a downward movement of the surrounding air through the air-shaft D, following the course indicated by the arrows directly to the body of the flame. The quantity of air required for the proper support of the flame being directly dependent upon the rate of combustion, it follows that the greater the upward current the stronger will be the downward-induced current, and vice versa. The harmonious operation of the reversed currents is aided by the effect produced by the cone-deflectors E E' E². The lower one E², extending over the mouth of the shaft D, prevents any sudden disturbing-currents of air from passing downward to the flame, and the whole of them being protected by the collar F and furthermore by the shield G the ascending and descending currents are caused to operate in comparative quietude. As long as the prevailing temperature is sufficient to vaporize the carbureting material employed the lamp will continue to burn as described; but when it is desired to increase the amount of vaporization from any cause—such as cold weather—then the device shown by Fig. 2 is brought into play. By an adjustment of the register P air is admitted to the space T, where it is heated by radiation from the lamp and passes up through the neck or opening Q to and through the space S and imparts its heat to the carburetor and increases the vaporization of the gasoline contained therein. At the same time the said device and air-current created through it operates as a ventilator to the car.

In our experiments we have found that the extension-piece C is not an absolute necessity to the operation of the apparatus; but its use results in a more efficient service, and we prefer its co-operation.

Having thus described our invention, what we claim, and desire to secure by Letters Patent, is—

1. In an apparatus for carbureting air and burning the product, a carburetor H, a casing I, surrounding the carburetor, with an air-space S between them, a burner A, and pipe M, connecting the burner and carburetor, combined with a chimney B, an air-shaft D, encircling the chimney, and a casing O, surrounding the lower part of the air-shaft D and communicating with said air-space S, said casing being provided with openings for the admission of air, substantially as described.

2. In an apparatus for carbureting air and burning the product, a carburetor H, a casing surrounding said carburetor, with an air-space S between them, a burner, a pipe connecting the carburetor and burner, a chimney, and an air-shaft encircling said chimney and having communication with the burner and the open air, combined with a casing O, surrounding the burner and the lower part of the air-shaft D, said casing having openings for the admission of air and being in communication with said air-space S, a register to control said openings, cone-deflectors surmounting the chimney and air-shaft, a collar surrounding the deflectors, and a cap G, having openings in its side arranged over the deflectors and the collar, substantially as described.

In witness whereof we have hereunto subscribed our names in the presence of two witnesses.

EDWARD J. FROST.
WILLIS C. SQUIRE.

Witnesses as to Edward J. Frost:
ANNA ROWNTREE,
M. P. STEVENS.

Witnesses as to Willis C. Squire:
GEO. W. REED,
WM. BARNET LE VAN.